(12) United States Patent
Atur et al.

(10) Patent No.: US 12,494,969 B2
(45) Date of Patent: Dec. 9, 2025

(54) OPTIMIZING RESOURCE SCALING

(71) Applicant: Rakuten Symphony, Inc., Tokyo (JP)

(72) Inventors: Sree Nandan Atur, Newark, CA (US); Ravi Kumar Alluboyina, Santa Clara, CA (US)

(73) Assignee: Rakuten Symphony, Inc., Tokyo (JP)

( * ) Notice: Subject to any disclaimer, the term of this patent is extended or adjusted under 35 U.S.C. 154(b) by 0 days.

(21) Appl. No.: 18/018,646

(22) PCT Filed: Dec. 19, 2022

(86) PCT No.: PCT/US2022/053370
§ 371 (c)(1),
(2) Date: Jan. 30, 2023

(87) PCT Pub. No.: WO2024/136837
PCT Pub. Date: Jun. 27, 2024

(65) Prior Publication Data
US 2025/0310202 A1 Oct. 2, 2025

(51) Int. Cl.
G06F 15/173 (2006.01)
G06N 3/0442 (2023.01)
G06N 3/08 (2023.01)
H04L 41/0897 (2022.01)
H04L 41/147 (2022.01)
H04L 41/16 (2022.01)
H04L 43/08 (2022.01)

(52) U.S. Cl.
CPC ....... *H04L 41/0897* (2022.05); *G06N 3/0442* (2023.01); *G06N 3/08* (2013.01); *H04L 41/147* (2013.01); *H04L 41/16* (2013.01); *H04L 43/08* (2013.01)

(58) Field of Classification Search
None
See application file for complete search history.

(56) References Cited

U.S. PATENT DOCUMENTS

| | | |
|---|---|---|
| 9,130,826 B2 | 9/2015 | Nispel |
| 9,444,884 B2 | 9/2016 | Newton |
| 9,454,537 B2 | 9/2016 | Prahlad |
| 9,578,088 B2 | 2/2017 | Nickolov |
| 9,721,210 B1 | 8/2017 | Brown |
| 10,027,605 B2 | 7/2018 | Agarwal |

(Continued)

*Primary Examiner* — Phuoc H Nguyen
(74) *Attorney, Agent, or Firm* — David R. Stevens; Stevens Law Group

(57) ABSTRACT

The present invention extends to methods, systems, and computer program products for optimizing resource allocation in view of predicted network traffic patterns and predicted power consumption. Network packets defining a network traffic flow can be received at a platform over time. Metrics can be derived from one or more applications executing on resources of the platform and processing data contained in the network data packets. Model training data can be formulated from the metrics. A resource adjustment model can be trained using the model training data. Executing the model can be automated to adjust resource allocation at the platform. Additional network packets defining an additional network traffic flow can be received at a platform over time. Data contained in the additional network packets can be processed using the adjusted resource allocation.

20 Claims, 7 Drawing Sheets

(56) References Cited

U.S. PATENT DOCUMENTS

| | | | |
|---|---|---|---|
| 10,171,371 B2* | 1/2019 | Anwar | H04L 67/1029 |
| 10,191,778 B1 | 1/2019 | Yang et al. | |
| 10,439,886 B2 | 10/2019 | Lapiotis | |
| 10,791,168 B1* | 9/2020 | Dilley | H04L 41/22 |
| 10,956,849 B2 | 3/2021 | Wu | |
| 11,005,731 B2* | 5/2021 | Saha | H04L 41/0823 |
| 11,082,244 B2 | 8/2021 | McNamee | |
| 11,119,529 B2 | 9/2021 | Seenappa | |
| 11,128,699 B1* | 9/2021 | Khurrum | G06F 9/45558 |
| 11,196,679 B2* | 12/2021 | Niu | H04L 45/245 |
| 12,020,566 B2* | 6/2024 | Pittman | G08G 1/0112 |
| 2016/0148507 A1* | 5/2016 | Pittman | G06Q 30/0255 |
| | | | 340/917 |
| 2016/0225259 A1* | 8/2016 | Harris | H04W 28/0247 |
| 2017/0150399 A1 | 5/2017 | Kedalagudde | |
| 2017/0193501 A1* | 7/2017 | Cole | G06Q 20/326 |
| 2020/0120131 A1* | 4/2020 | Soni | G06N 3/08 |

\* cited by examiner

OPTIMIZING RESOURCE SCALING

CROSS-REFERENCE TO RELATED APPLICATIONS

Not applicable.

BACKGROUND

1. Field of the Invention

This invention relates generally to the field of computing, and, more particularly, to optimizing resource scaling in view of predicted network traffic patterns and predicted power consumption.

2. Related Art

Data intensive and network intensive applications running on a (e.g., Kubernetes) cluster can be affined to resources respecting a Non-Uniform Memory Access (NUMA) boundary. The amount of work done by these applications is directly proportional to the amount of data or network packets processed. The amount of data or network packets processed is in turn directly proportional to resource utilization. Further, resource utilization as well as resource maintenance is directly proportion to wattage (power consumed). Utilizing, or even merely maintaining, more resources consumes more power.

When an amount of data or network packets is insufficient to fully utilize allocated resources, the allocated resources may be at least partially idle resulting inefficient power usage. When an amount of data or network packets is too much for allocated resources, data and/or network packets can be dropped resulting in retransmission or potential data loss.

Some resource (e.g., network function) scaling approaches attempt to scale allocated resources to an amount of data or network packets being received. However, these resource scaling approaches fail to fully resolve power use inefficiencies and/or packet loss.

Within a cluster, some resource scaling approaches use custom metrics (traffic flow) to determine vertical pod scaling (VPA) and horizontal pod scaling (HPA). However, using custom metrics can become tedious and rigid when thresholds need to be changed and fine-tuned. Across clusters, resource scaling can be threshold based. Manually specified metrics can be used to determine when to scale the number of pods. An external orchestrator can subscribe to events and take placement decisions which is dependent on the topology. Further, both within a cluster and across clusters, resource scaling decisions typically occur after a change (e.g., increase or decrease) in traffic flow. So even when utilizing these resource scaling approaches, incoming data or network packets can be sub-optimally balanced with allocated resources for some amount of time.

BRIEF DESCRIPTION OF THE DRAWINGS

The specific features, aspects and advantages of the present invention will become better understood with regard to the following description and accompanying drawings where.

DETAILED DESCRIPTION

Figure 1A:
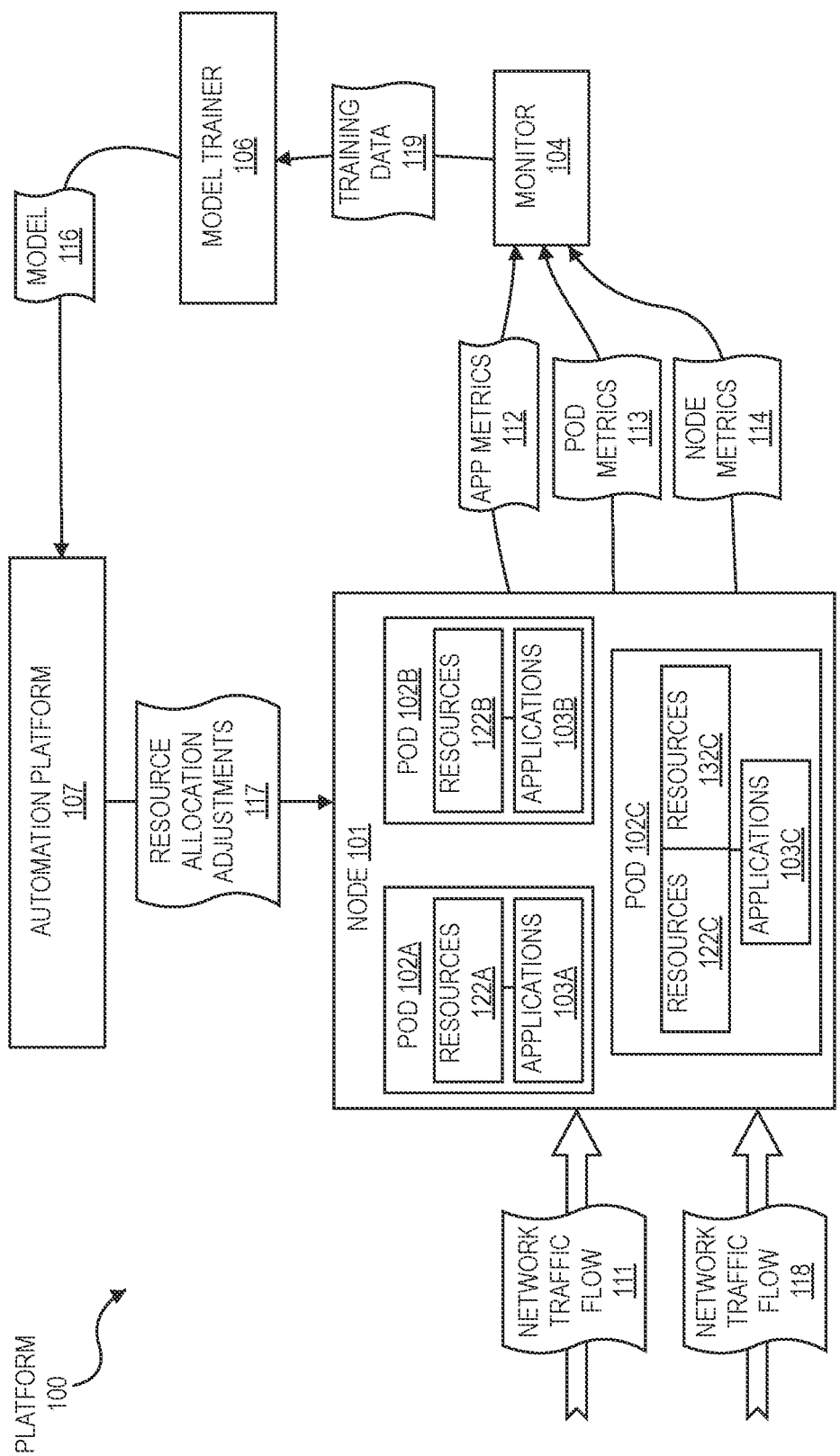
FIG. 1A illustrates an example platform architecture that facilitates optimizing resource scaling.

The present invention extends to methods, systems, and computer program products for optimizing resource (e.g., network function) scaling in view of predicted network traffic patterns and predicted power consumption.

When more resources are allocated, corresponding applications can deliver more (or maximum) work. However, the data volume may be low enough that all data is processable using less than all of the allocated resources. If more resources are nonetheless allocated, power resources can be underutilized (or wasted).

When fewer resources are allocated power can be conserved. However, the data volume may be too high for the allocated resources to handle all of the data. If fewer resources are nonetheless allocated, data can be lost (e.g., packets can be dropped).

A median amount of resources may also me allocated. If a median amount of resources are allocated, power resources can be underutilized (or wasted) and/or data can be lost (e.g., packets can be dropped) overtime as data volume changes.

Aspects of the invention can predict resources workload over time and adjust allocated resources (e.g., network function) to deliver a larger amount of work while consuming less power. Resource allocation can be adjusted (e.g., increased or decreased) based on (e.g., network) traffic flow patterns to mitigate packet drops for applications.

Network traffic can be predicted based on past learnings and resource allocation can be adjusted ahead of time. Resource allocation scaling can be optimized to network traffic patterns. Network traffic patterns can be predicted based on historical Key Performance Indicators (KPIs), trends, metrics, etc. with enough probability to optimize resource allocation scaling.

As such, potential resource allocation issues (e.g., inefficient power usage, packet drops, etc.) can be predicted prior to occurring. In response predicting a processing issue, resource allocation is adjusted (e.g., increased or decreased) based on the historical Key Performance Indicators (KPIs), trends, metrics, etc. Adjustments can take corrective actions in terms of: optimal usage of power resources, scaling application instances, healing application instances (e.g., with migration/relocation), upgrading applications, etc.

In one aspect, a Recurrent Neural Network (RNN), such as, a Long Short-Term Memory (LTSM) model, can be used to predict future network traffic patterns based on prior network traffic patterns. Resource (e.g., network function) allocation scaling can be optimized in view of predicted future network traffic patterns. Resource allocation scaling can include vertical scaling (up/down) and/or horizontal scaling (in/out). Resource allocation scaling can also include relocating a pod with a scaled out configuration onto another node with enough resources.

In this description and the following claims, "vertically scaling" is defined as changing available resources at a node, pod, etc. Vertical scaling can include: (1) adding resources to a node, pod, etc. (i.e., scaling up) and/or (2) removing resources from a node, pod, etc. (i.e., scaling down). Vertical scaling can include adding/removing processing units, memory, storage, networking capabilities, etc. from a node, pod, etc. or even from a single computer system In this description and the following claims, "horizontal scaling" is defined as changing the number of nodes, pods, etc. in a system or platform. Horizontal scaling scan include: (1) adding one or more nodes, pods, etc. to a system or platform (i.e., scaling out) and/or (2) removing one or more nodes, pods, etc. from a system or platform (i.e., scaling in). Nodes, pods, etc. added to and/or removed from a system or platform can include processing units, memory, storage, networking capabilities, etc.

In this description and the following claims, a "processing unit" is defined as electronic circuitry that executes instructions of a computer program. A processing unit can be a central processing unit (CPU), a Graphical Processing Units (GPUs), a general-purpose GPUs (GPGPUs), a Field Programmable Gate Arrays (FPGA), an application specific integrated circuits (ASICs), a Tensor Processing Units (TPUs), etc. Processing unit is also defined to include a core of a multi-core processor.

In this description and the following claims, a "multi-core processor" is defined as a microprocessor on a single integrated circuit with two or more separate processing units, called cores, each of which reads and executes program instructions. The instructions are ordinary CPU instructions (such as add, move data, and branch) but the single processor can run instructions on separate cores at the same time, increasing overall speed for programs that support multi-threading or other parallel computing techniques.

In this description and the following claims, a "pod" is defined as an abstraction that represents a group of shared resources (e.g., processor, storage, memory, networking, etc.) and one or more applications.

In this description and the following claims, a "node" is defined as a worker machine and can be a virtual machine or a physical machine. A node can include multiple pods.

In this description and the following claims, "Non-Uniform Memory Access (NUMA)" is a computer memory design used in multiprocessing where memory access time depends on memory location relative to a processor. Under NUMA, a processor can access its own local memory and storage faster than non-local memory and storage (i.e., memory/storage local to another processor or memory/storage shared between processors). A NUMA architecture can include one or more "nodes" of resources. The resources at a NUMA node can include a plurality of CPUs connected to volatile memory and connected to one or more Non-Volatile Memory Express (NVMe) (or other) storage devices.

FIG. 1 illustrates an example platform architecture 100 that facilitates optimizing resource scaling. As depicted, platform architecture 100 includes node 101, monitor 104, model trainer 106, and automation platform 107. Node 101 further includes pods 102A, 102B, and 102C. Pod 102A includes resources 122A (e.g., processor, storage, memory, networking, etc.) and applications 103A (running on resources 122A). Pod 102B includes resources 122B (e.g., processor, storage, memory, networking, etc.) and applications 103B (running on resources 122B). Pod 102C includes resources 122C and 132C (e.g., processor, storage, memory, networking, etc.) and applications 103C (resources 122C and 132C). It may be that node 101 is a NUMA node.

In general, node 101 can receive a plurality of network packets over time defining an existing network traffic flow. Applications at node 101 can utilize corresponding pod resources. For example, applications 103A can utilize resources 122A. Similarly, applications 103B can utilize resources 122B. Likewise, applications 103C can utilize resources 122C and 132C.

Applications 103A, 103B, 103C, can process data contained in the network packets. The speed an application can process data depends on resources allocated to the pod where the application is running. An application may be able to process data faster when running on a pod with more allocated resources. On the other hand, an application processes data slower when running on pod with less allocated resources.

Over time, monitor 104 can monitor node 101, pods 102A, 102B, and 102C, and applications 103A, 103B, and 103C. Monitor 104 can collect metrics associated with any of: node 101, pods 102A, 102B, and 102C, and applications 103A, 103B, and 103C during processing of data contained in network packets by any of: applications 103A, 103B, and 103C. Monitor 104 can derive training data from the collected metrics. The derived training data can be used to train resource adjustment models. Monitor 104 can send the derived training data to model trainer 106.

Model trainer 106 can receive training data from monitor 104. Model trainer 106 can train resource adjustment models using the training data. Resource adjustment models can be RNNs such at LTSM models. Model trainer 106 can send resource adjustment models to automation platform 107.

A model can be configured to implement various conditions:

| | |
|---|---|
| Case 1: | 0% packet drops<br>Mitigate packet drop independent<br>of incoming network traffic rate |
| Case 2: | Minimal acceptable packet drops<br>based on processing unit temperature<br>Depending on processing unit operating<br>temperature, there can be scenarios<br>where packet drops are acceptable.<br>Packet drops can be minimized as much<br>as possible while keeping processing unit<br>temperature below a maximum allowable<br>temperature (e.g., 100° C.) |
| Case 3: | x % power savings<br>It's not necessary user wants to achieve highest<br>power savings because sometimes cost for x %<br>power savings (e.g., 25%) is the same as cost<br>for y % power savings (e.g., 30%) |
| Case 4: | Latency requirements defines critical RT,<br>non-critical RT deployment<br>Inference latency<br>Metrics interval period |

Automation platform 107 can receive resource adjustment models from model trainer 106. Automation platform 107 can execute a resource adjustment model to predict network packets defining further network traffic flow patterns to be received at node 101. Based on predicted further network traffic flow patterns, automation platform 107 can send resource allocation adjustments to node 101. The resource allocation adjustments can include instructions to adjust (e.g., increase or decrease) resources allocated at node 101. Resource allocation adjustments can be include vertically scaling (up or down) resources of a pod, horizontally scaling pods at node 101 (in or out), or relocating one or more pods to a different node.

Node 101 can receive resource allocation adjustments from automation platform 107. Node 101 can adjust the resource allocation at any of: node 101, another node, pods 102A, 102B, 102C, or another pod in accordance with instructions included in received resource allocation adjustments. Adjusting allocated resources can optimize resources for processing data in network packets of the further network flow.

Figure 2:
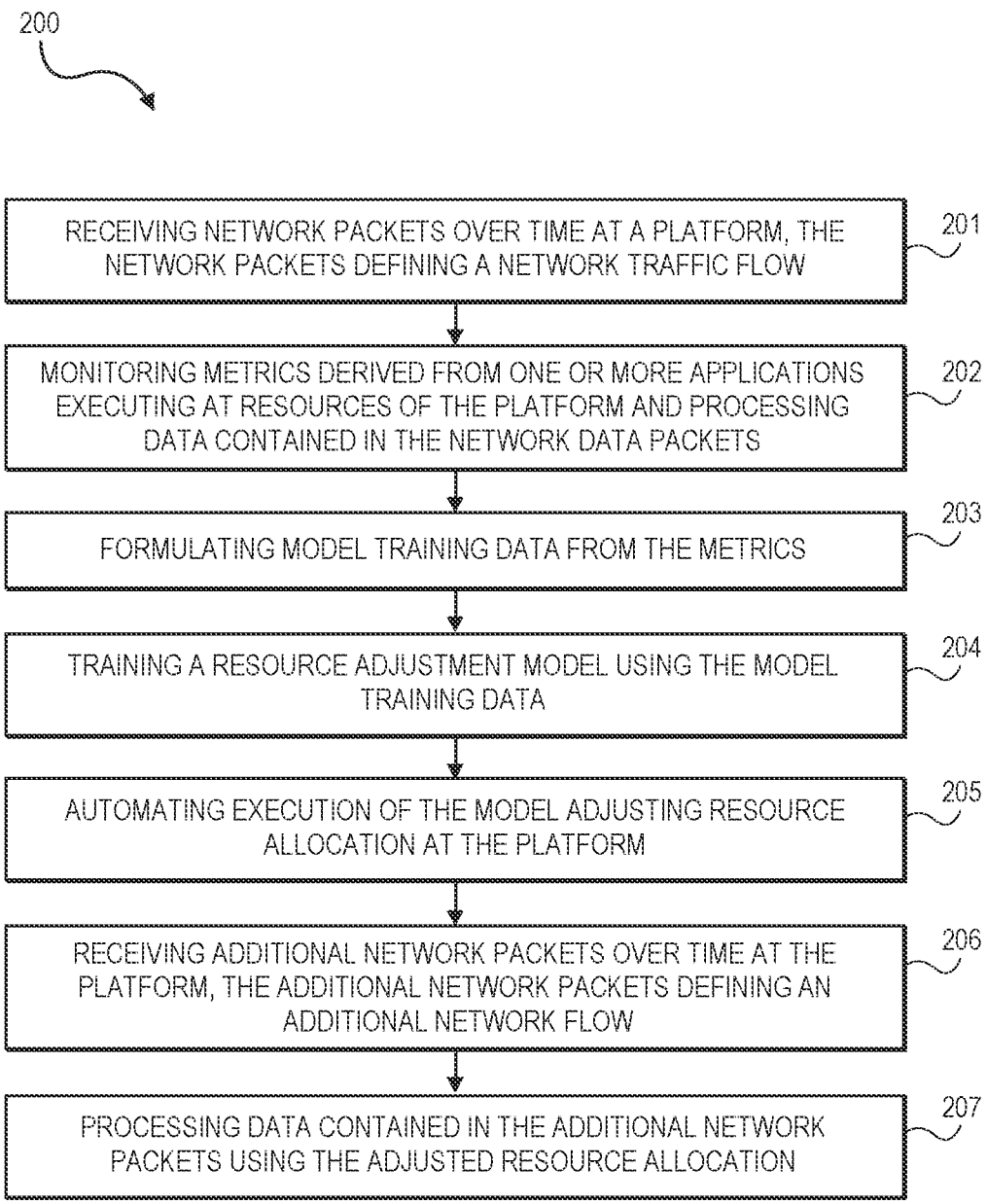
FIG. 2 illustrates a flow chart of an example method for optimizing resource scaling.

FIG. 2 illustrates a flow chart of an example method 200 for optimizing resource scaling. Method 200 will be described with respect to the components and data in platform architecture 100.

Method 200 includes receiving network packets over time at a platform, the network packets defining a traffic network flow (201). For example, node 101 can receive a plurality of network packets over time defining network traffic flow 111. Applications at node 101 can run on and/or utilize corresponding resources and can process data contain in the network packets of network traffic data flow 111. For example, an application 103A can run on and/or utilize resources 122A to process data contained in the network packets of network traffic data flow 111. Similarly, an application 103B can run on and/or utilize resources 122B to process data contained in the network packets of network traffic data flow 111. Likewise, an application 103C can run on and/or utilize resources 122C/132C to process data contained in the network packets of network traffic data flow 111

Method 200 includes monitoring metrics derived from one or more applications executing at resources the platform and processing data contained in the network data packets (202). For example, monitor 104 can monitor app metrics 112, pod metrics 113, and node metrics 114 derived from applications 103A executing on and/or utilizing resources 122A, from applications 103B executing on and/or utilizing resources 122B, and from applications 103C executing on and/or utilizing resources 122C/132C. Applications 103A, 103B, and 103C can process data contained in network packets of network traffic flow 111. App metrics 112 can be metrics corresponding to applications 103A, 130B, and 103C. Pod metrics 113 can be metrics corresponding to pods 102A, 102B, and 102C. Node metrics 114 can be metrics corresponding to node 101.

Method 200 includes formulating model training data from the metrics (203). For example, monitor 104 can formulate training data 119 from app metrics 112, pod metrics 113, and node metrics 114. Monitor 104 can send training data 119 to model trainer 106. Model trainer 106 can receive training data 119 from monitor 104. Method 200 includes training a resource adjustment model using the model training data (204). For example, model trainer 106 can train model 116 using training data 119. Model 116 can be an RNN, such as, as an LTSM model, configured to predict subsequent network traffic flows received at node 101. Model trainer 106 can send model 116 to automation platform 107. Automation platform 107 can receive model 116 from model trainer 106.

Method 200 includes automating execution of the model adjusting resource allocation at the platform (205). For example, automation platform 107 can automate execution of model 116. Executing model 116 can predict network packets defining network traffic flow 118 are to be received at node 101. Based on predicting network traffic flow 118, automation platform 107 can derive resource allocation adjustments 117. Automation platform 107 can send resource allocation adjustments 117 to node 101.

Node 101 can adjust the allocation of resources within platform 100, within node 101, withing any of pods 102A, 102B, 102C in accordance with resource allocation adjustments 117. Resources can be adjusted (e.g., vertically scaled (up or down), horizontally scaled (in or out), pods relocated, etc.) in anticipation of receiving the network packets defining network traffic flow 118. Adjusting resource allocations can optimize the resources for processing the network packets defining network traffic flow 118. For example, resources can be vertically scaled down and/or horizontally scaled in if the workload associated with network traffic flow 118 is anticipated to be less than the workload associated with network traffic flow 111. One the other hand, resources can be vertically scaled up and/or horizontally scaled out and/or pods relocated if the workload associated with network traffic flow 118 is anticipated to be more than the workload associated with network traffic flow 111.

Method 200 includes receiving additional network packets over time at the platform, the additional network packets defining an additional network flow overtime (206). For example, subsequent to receiving network packets defining network traffic flow 111, node 101 can receive additional network packets defining network traffic flow 118.

Method 200 includes processing data contained in the additional network packets using the adjusted resource allocation (207). For example, one or more of applications 103A, 103B, 103C can process data contained in network packets of network traffic flow 118 using resources previously adjusted in accordance with resource allocation adjustments 117. Processing data using the adjusted resource allocation optimizes data processing by providing sufficient processing resources in a manner that also minimizes power consumption.

Method 200 or portions thereof can be repeated responsive to processing data packets in network traffic flow 118 to further refine a resource adjustment model configured to adjust resource allocations at platform architecture 100. Method 200 or portions thereof can also be implemented in environments spanning multiple nodes, where metrics are gathered from the multiple nodes and utilized to train a predictive model. Implementations can also include combinations of repeating method 200 or portions thereon in environments spanning multiple nodes.

Figure 1B:
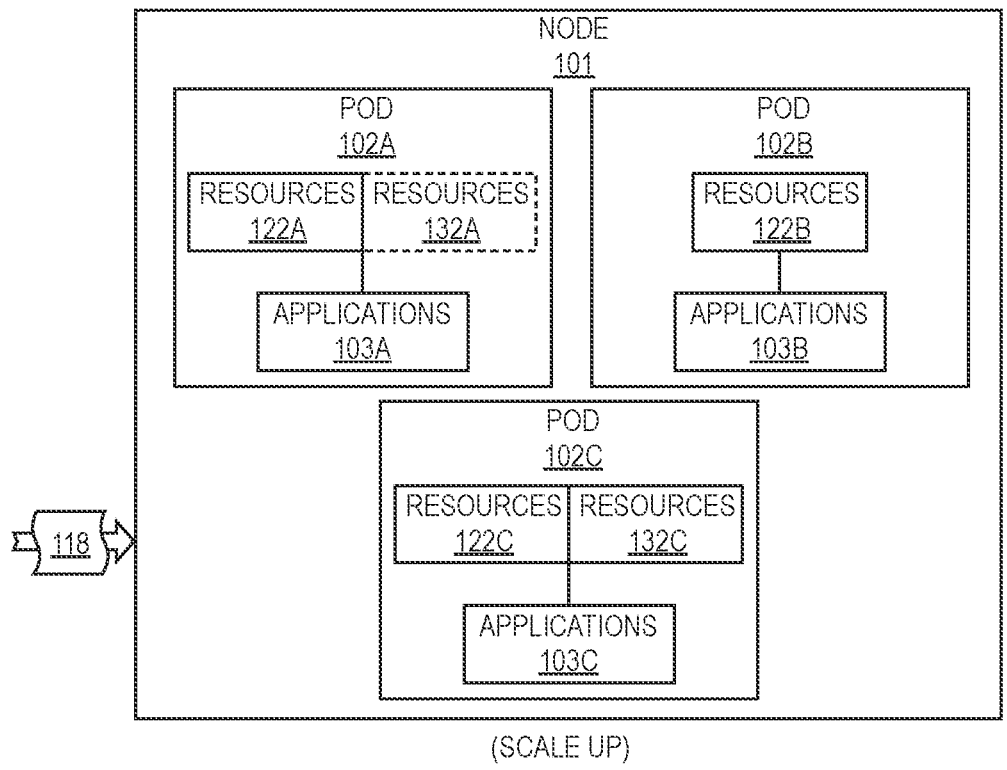
FIG. 1B illustrates an example scaled up node.

FIG. 1B illustrates an example scaled up node. As depicted, pod 102A is vertically scaled up to include resources 132A. Resources 132A can be allocated to pod 102A in accordance with resource allocation adjustments 117. Resources 132A can include one or more of processor, storage, memory, networking, etc. resources. Applications 103A can run on and/or utilize resources 122A/132A to process data contained in network packets of network traffic flow 118. Pod 102A can be scaled up (by adding resources 132A) responsive to model 116 anticipating the workload associated with processing network traffic flow 118 to be more than the workload associated with processing network traffic flow 111.

Figure 1C:
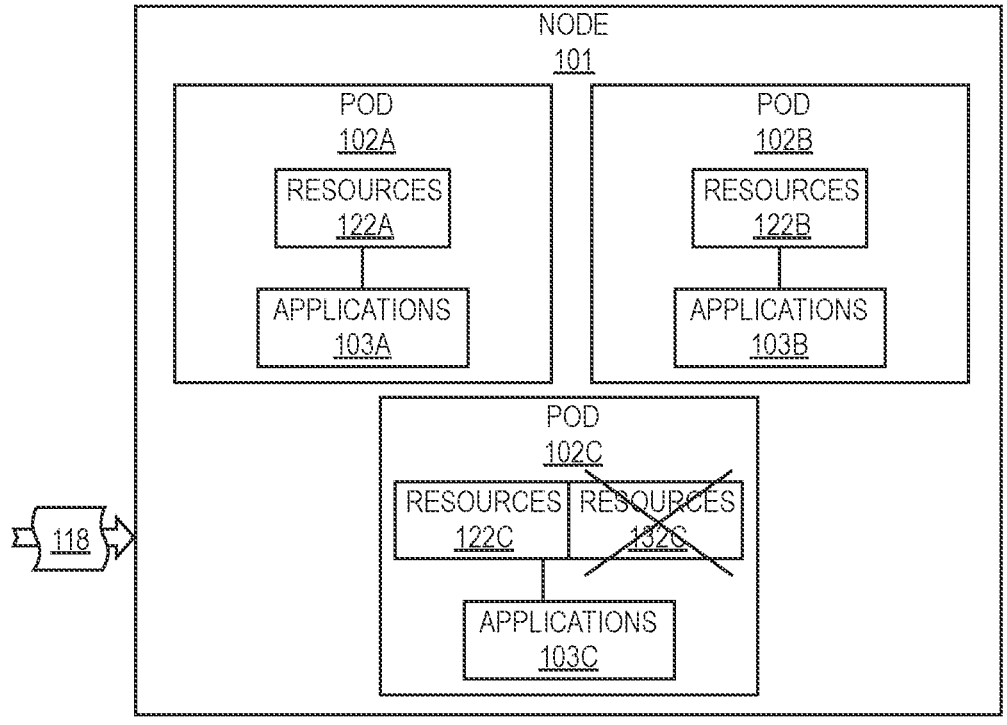
FIG. 1C illustrates an example scaled down node.

FIG. 1C illustrates an example scaled down node. As depicted, pod 102C is vertically scaled down to resources 132C. Resources 132C can be removed from pod 102C in accordance with resource allocation adjustments 117. Removing resources 132C can include removing one or more of processor, storage, memory, networking, etc. resources. After resources 132C are removed, applications 103C can then run on and/or utilize resources 122C to process data contained in network packets of network traffic flow 118. Pod 102C can be scaled down (by removing resources 132C) responsive to model 116 anticipating the workload associated with processing network traffic flow 118 to be less than the workload associated with processing network traffic flow 111.

Figure 1D:
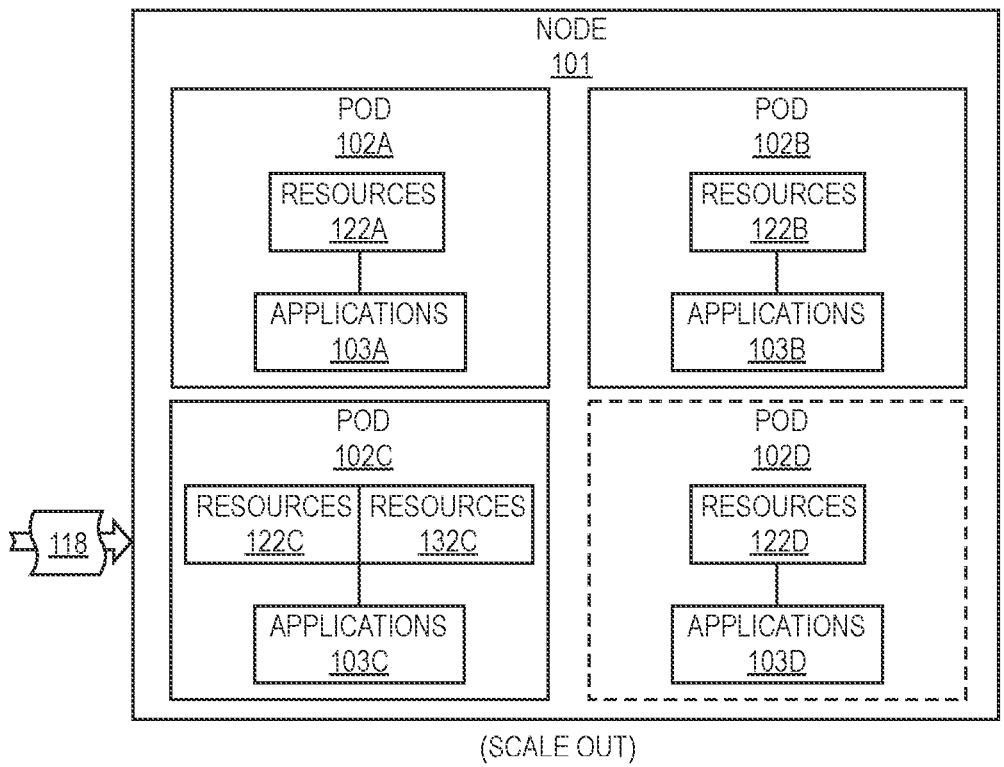
FIG. 1D illustrates an example scaled out node.

FIG. 1D illustrates an example scaled out node. As depicted, node 101 is horizontally scaled out to include pod 102D. Pod 102D further includes resources 122D (e.g., one or more of processor, storage, memory, networking, etc. resources) and applications 103D. Pod 102D can be allocated to node 101 in accordance with resource allocation adjustments 117. Applications 103D can run on and/or utilize resources 122D to process data contained in network packets of network traffic flow 118. Node 101 can be scaled out (by adding pod 102D) responsive to model 116 anticipating the workload associated with processing network traffic flow 118 to be more than the workload associated with processing network traffic flow 111.

Figure 1E:
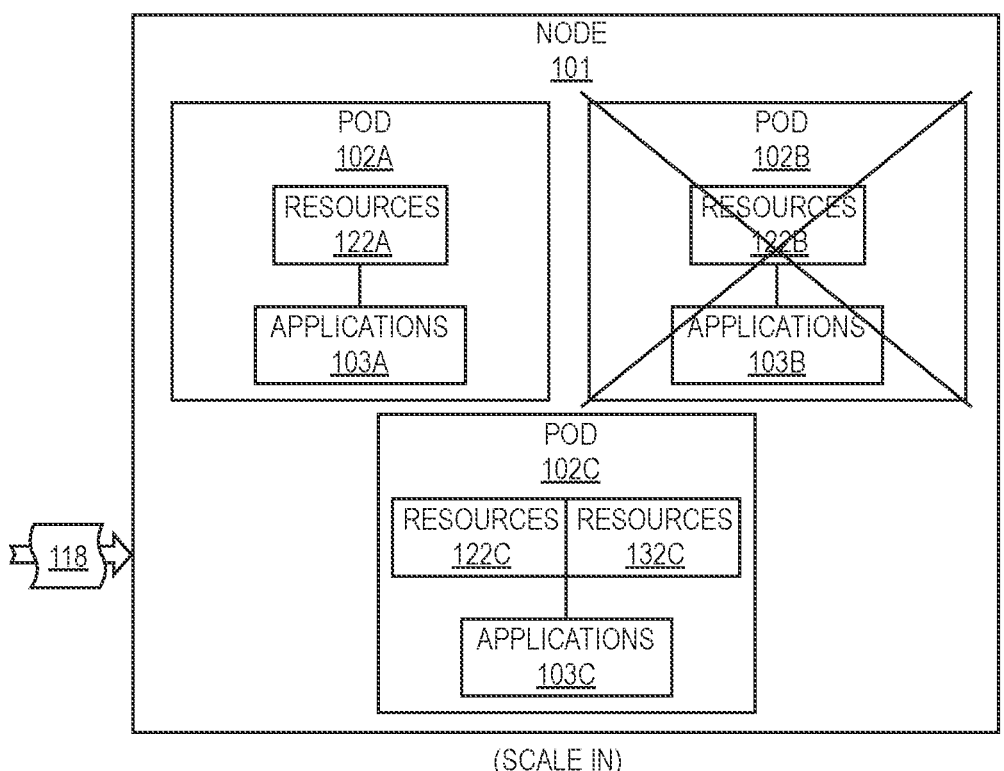
FIG. 1E illustrates an example scaled in node.

FIG. 1E illustrates an example scaled in node. As depicted, node 101 is horizontally scaled in by removing pod 102B. Pod 102B can be removed from node 101 in accordance with resource allocation adjustments 117. Removing pod 102B can include removing resources 122B (including removing one or more of processor, storage, memory, networking, etc. resources) and applications 103B. After resources pod 102B is removed, pods 102A and 102C can process data contained in network packets of network traffic flow 118. Node 101 can be scaled in (by removing pod 102B) responsive to model 116 anticipating the workload associated with processing network traffic flow 118 to be less than the workload associated with processing network traffic flow 111.

Figure 1F:
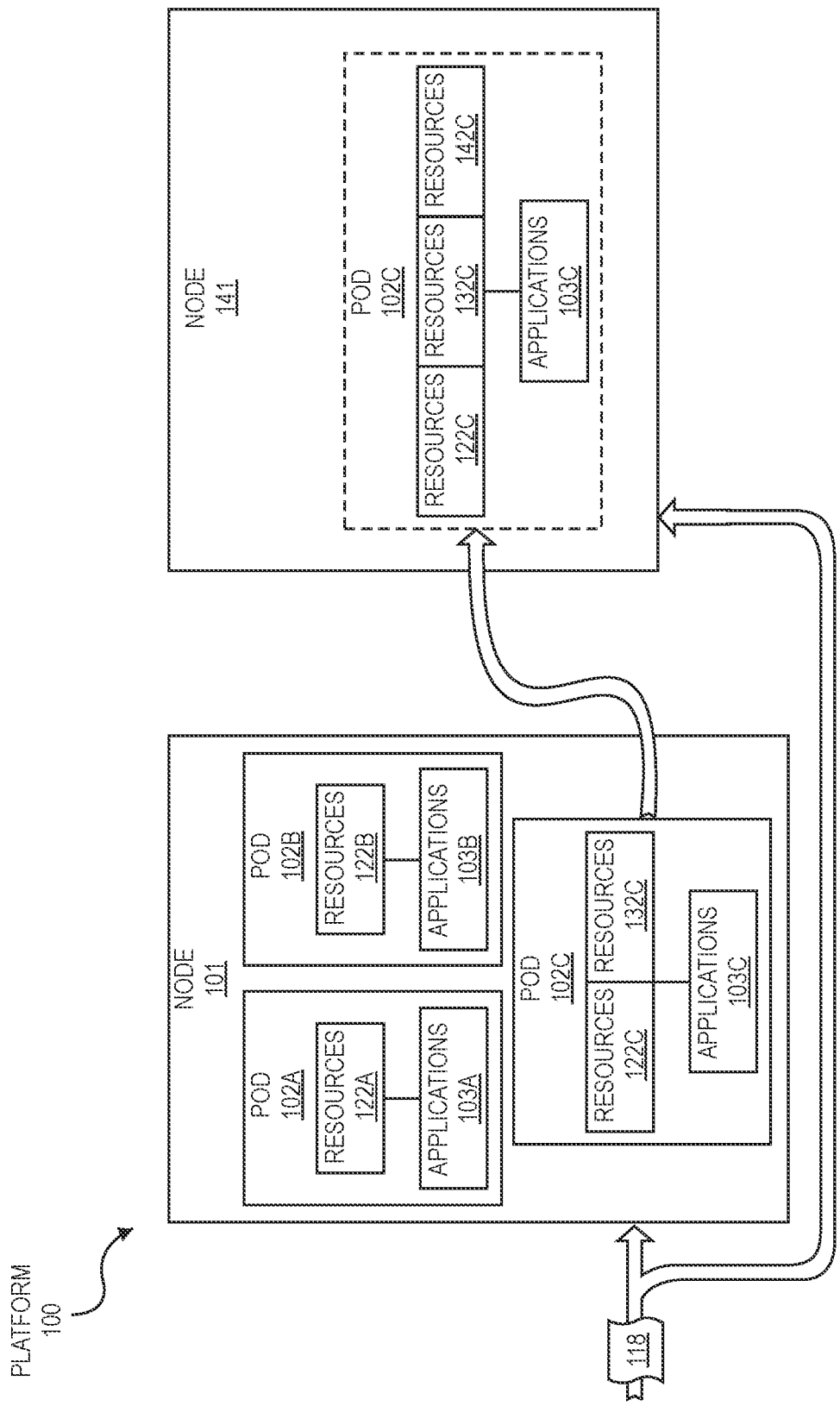
FIG. 1F illustrates an example of relocating a scaled up pod.

FIG. 1F illustrates an example of relocating a scaled up pod. Resource allocation adjustments 117 can indicate that pod 102C is to be vertically scaled up to include resources 142C. However, node 101 may lack sufficient resources to allocate resources 142C to pod 102C. In response, pod 102C can be relocated from node 101 to node 141. It may be that node 141 is a NUMA node.

After relocation and re-allocation of resources 122C and resources 132C at node 141, pod 102 can be scaled up to include resources 142C. Resources 142A can be allocated to pod 102C in accordance with resource allocation adjustments 117. Resources 142A can include one or more of processor, storage, memory, networking, etc. resources. Applications 103C can run on and/or utilize resources 122C/132C/142C to process data contained in network packets of network traffic flow 118. Pod 102C can be relocated and scaled up (by adding resources 142C) responsive to model 116 anticipating the workload associated with processing network traffic flow 118 to be more than the workload associated with processing network traffic flow 111.

Figure 1G:
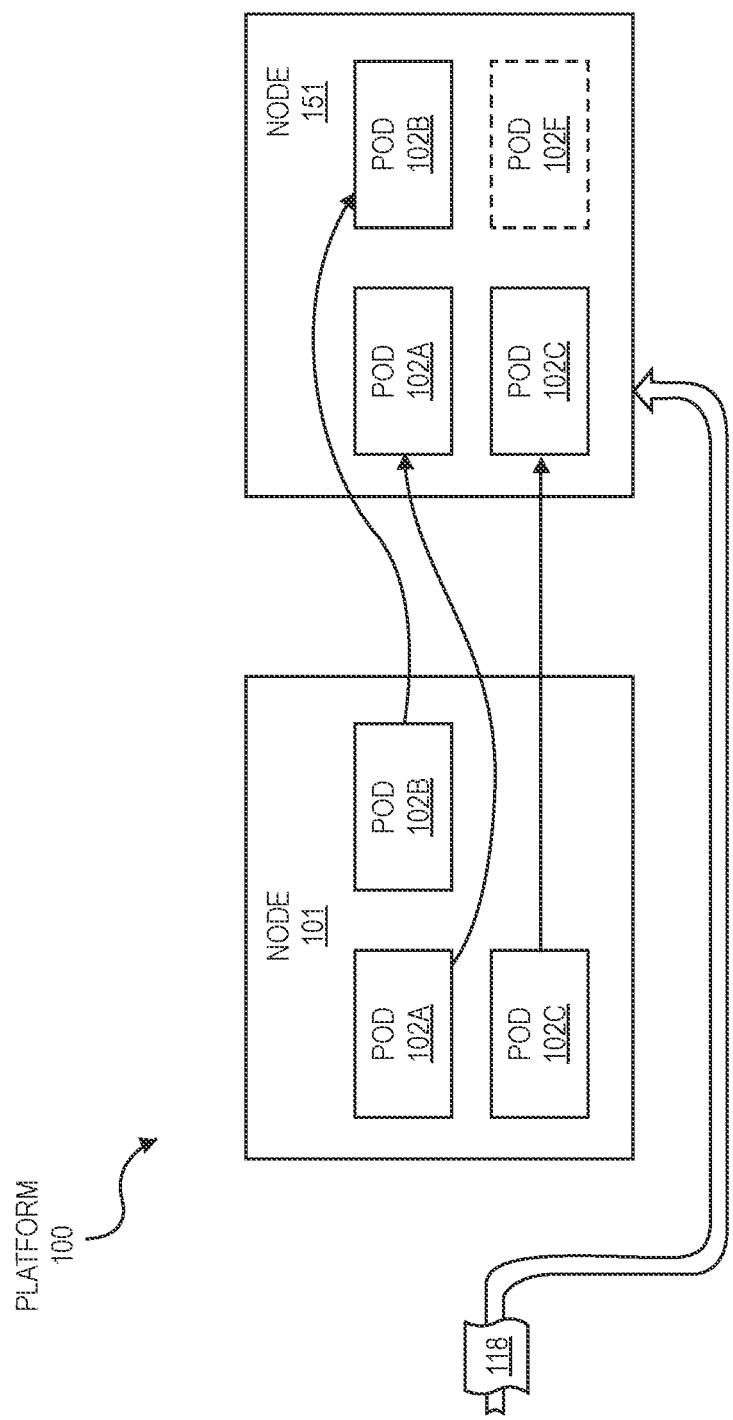
FIG. 1G illustrations an example relocating a scaled out node.

FIG. 1G illustrations an example relocating a scaled out node. Resource allocation adjustments 117 can indicate that node 101 is to be horizontally scaled out to include pod 102F. However, node 101 may lack sufficient resources to allocate resources for pod 102F. There may also be a requirement that pods 102A, 102B, 102C, and 102F be located at the same node. In response, pods 102A, 102B, and 102C can be relocated from node 101 to node 151 and node 151 horizontally scaled out to include pod 102F. It may be that node 151 is a NUMA node.

Pod 102F can include resources (e.g., one or more of processor, storage, memory, networking, etc. resources) and applications. Pod 102F can be allocated to node 151 in accordance with resource allocation adjustments 117. Applications at pod 102F can run on and/or utilize resources of pod 102F to process data contained in network packets of network traffic flow 118. Node 151 can be scaled out (by adding pod 102F) responsive to model 116 anticipating the workload associated with processing network traffic flow 118 to be more than the workload associated with processing network traffic flow 111.

FIGS. 1B-1G describe examples of resources allocation adjustments that automation platform 107 can implement when automating execution of a model (205).

Figure 3:
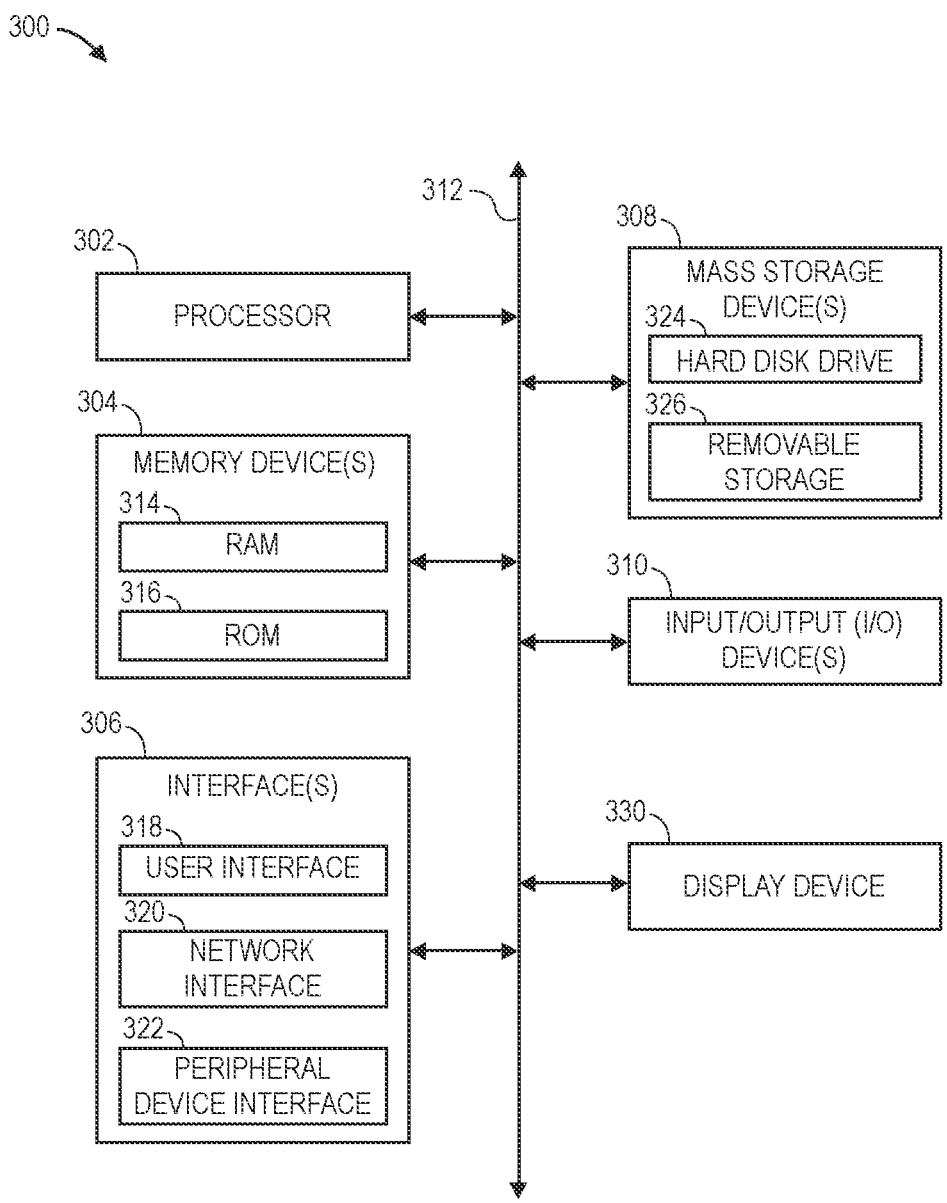
FIG. 3 illustrates an example block diagram of a computing device.

FIG. 3 illustrates an example block diagram of a computing device 300. Computing device 300 can be used to perform various procedures, such as those discussed herein. Computing device 300 can function as a server, a client, or any other computing entity. Computing device 300 can perform various communication and data transfer functions as described herein and can execute one or more application programs, such as the application programs described herein. Computing device 300 can be any of a wide variety of computing devices, such as a mobile telephone or other mobile device, a desktop computer, a notebook computer, a server computer, a handheld computer, tablet computer and the like.

Computing device 300 includes one or more processor(s) 302, one or more memory device(s) 304, one or more interface(s) 306, one or more mass storage device(s) 308, one or more Input/Output (I/O) device(s) 310, and a display device 330 all of which are coupled to a bus 312. Processor(s) 302 include one or more processors or controllers that execute instructions stored in memory device(s) 304 and/or mass storage device(s) 308. Processor(s) 302 may also include various types of computer storage media, such as cache memory.

Memory device(s) 304 include various computer storage media, such as volatile memory (e.g., random access memory (RAM) 314) and/or nonvolatile memory (e.g., read-only memory (ROM) 316). Memory device(s) 304 may also include rewritable ROM, such as Flash memory.

Mass storage device(s) 308 include various computer storage media, such as magnetic tapes, magnetic disks, optical disks, solid state memory (e.g., Flash memory), and so forth. As depicted in FIG. 3, a particular mass storage device is a hard disk drive 324. Various drives may also be included in mass storage device(s) 308 to enable reading from and/or writing to the various computer readable media. Mass storage device(s) 308 include removable media 326 and/or non-removable media.

I/O device(s) 310 include various devices that allow data and/or other information to be input to or retrieved from computing device 300. Example I/O device(s) 310 include cursor control devices, keyboards, keypads, barcode scanners, microphones, monitors or other display devices, speakers, printers, network interface cards, modems, cameras, lenses, radars, CCDs or other image capture devices, and the like.

Display device 330 includes any type of device capable of displaying information to one or more users of computing device 300. Examples of display device 330 include a monitor, display terminal, video projection device, and the like.

Interface(s) 306 include various interfaces that allow computing device 300 to interact with other systems, devices, or computing environments as well as humans. Example interface(s) 306 can include any number of different network interfaces 320, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 318 and peripheral device interface 322.

Bus 312 allows processor(s) 302, memory device(s) 304, interface(s) 306, mass storage device(s) 308, and I/O device(s) 310 to communicate with one another, as well as other devices or components coupled to bus 312. Bus 312 represents one or more of several types of bus structures, such as a system bus, PCI bus, IEEE 1394 bus, USB bus, and so forth.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can transform information between different formats, such as, for example, network packets, network traffic flows, app metrics, pod metrics, node metrics, training data, models, resource allocation adjustments, etc.

System memory can be coupled to the one or more processors and can store instructions (e.g., computer-readable instructions, computer-executable instructions, etc.) executed by the one or more processors. The system memory can also be configured to store any of a plurality of other types of data generated by the described components, such as, for example, network packets, network traffic flows, app metrics, pod metrics, node metrics, training data, models, resource allocation adjustments, etc.

Aspects of the invention can facilitate significant power savings (e.g., reducing power consumption by 30% to 40%). During prolonged off-peak hours workload relocation can optimize power savings even further. Using less power along with reduced operational expenses translates to financial savings. Aspects of the invention also (potentially significantly) reduce application downtime translating to higher availability and improved customer experience.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash or other vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications, variations, and combinations are possible in light of the above teaching. Further, it should be noted that any or all of the aforementioned alternate implementations may be used in any combination desired to form additional hybrid implementations of the disclosure.

What is claimed:

1. A computer implemented method comprising:
receiving network packets over time at a platform, the network packets defining a network traffic flow;
monitoring metrics derived from one or more applications executing at resources of the platform and processing data contained in the network packets;
formulating model training data from the metrics;
training a resource adjustment model using the model training data;
automating execution of the resource adjustment model adjusting resource allocation at the platform;
receiving additional network packets over time at the platform, the additional network packets defining an additional network flow; and
processing data contained in the additional network packets using the adjusted resource allocation.

2. The method of claim 1, wherein training a resource adjustment model comprises training a Recurrent Neural Network (RNN).

3. The method of claim 1, wherein training a resource adjustment model comprises training an Long Short-Term Memory (LTSM) model.

4. The method of claim 1, wherein automating execution of the model comprises executing the model to predict an increase in network traffic.

5. The method of claim 4, wherein adjusting resource allocation comprises vertically scaling up a pod at the platform by adding resources to the pod.

6. The method of claim 4, wherein adjusting resource allocation comprises horizontally scaling out the platform by adding a pod to the platform.

7. The method of claim 1, wherein automating execution of the model comprises executing the model to predict a decrease in network traffic.

8. The method of claim 7, wherein adjusting resource allocation comprises vertically scaling down a pod at the platform by removing resources from the pod.

9. The method of claim 7, wherein adjusting resource allocation comprises horizontally scaling in the platform by removing a pod from the platform.

10. The method of claim 1, wherein adjusting resource allocation comprises relocating a pod from a node of the platform to another node of the platform, wherein the other node has sufficient resources for the pod.

11. A computer system comprising:
a processor;
system memory coupled to the processor and storing instructions configured to cause the processor to:
receive network packets over time at a platform, the network packets defining a network traffic flow;
monitor metrics derived from one or more applications executing at resources of the platform and processing data contained in the network packets;
formulate model training data from the metrics;
train a resource adjustment model using the model training data;
automate execution of the resource adjustment model adjusting resource allocation at the platform;
receive additional network packets over time at the platform, the additional network packets defining an additional network flow; and
process data contained in the additional network packets using the adjusted resource allocation.

12. The computer system of claim 11, wherein instructions configured to train a resource adjustment model comprise instructions configured to train a Recurrent Neural Network (RNN).

13. The computer system of claim 11, wherein instructions configured to train a resource adjustment model comprise instructions configured to train an Long Short-Term Memory (LTSM) model.

14. The computer system of claim 11, wherein instructions configured to automate execution of the model comprise instructions configured to execute the model to predict an increase in network traffic.

15. The computer system of claim 14, wherein instructions configured to adjust resource allocation comprise instructions configured to vertically scale up a pod at the platform by adding resources to the pod.

16. The computer system of claim 14, wherein instructions configured to adjust resource allocation comprises instructions configured to horizontally scale out the platform by adding a pod to the platform.

17. The computer system of claim 11, wherein instructions configured to automate execution of the model comprise instructions configured to execute the model to predict a decrease in network traffic.

18. The computer system of claim 17, wherein instructions configured to adjust resource allocation comprise instructions configured to vertically scale down a pod at the platform by removing resources from the pod.

19. The computer system of claim 17, wherein instructions configured to adjust resource allocation comprise instructions configured to horizontally scale in the platform by removing a pod from the platform.

20. The computer system of claim 11, wherein instructions configured to adjust resource allocation comprises instructions configured to relocate a pod from a node of the platform to another node of the platform, wherein the other node has sufficient resources for the pod.

* * * * *